(12) United States Patent
Newell et al.

(10) Patent No.: US 9,769,517 B2
(45) Date of Patent: *Sep. 19, 2017

(54) ACCOUNT-SPECIFIC ENCRYPTION KEY

(71) Applicant: Echostar Technologies L.L.C., Englewood, CO (US)

(72) Inventors: Nicholas B. Newell, Highlands Ranch, CO (US); David A. Kummer, Highlands Ranch, CO (US); Kranti Kilaru, Castle Rock, CO (US); William N. Moran, Highlands Ranch, CO (US); Jason Anguiano, Castle Rock, CO (US)

(73) Assignee: Echostar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/195,720

(22) Filed: Jun. 28, 2016

(65) Prior Publication Data
US 2017/0034570 A1 Feb. 2, 2017

Related U.S. Application Data

(63) Continuation of application No. 12/324,634, filed on Nov. 26, 2008, now Pat. No. 9,414,031.

(51) Int. Cl.
*H04N 7/167* (2011.01)
*H04N 21/433* (2011.01)
(Continued)

(52) U.S. Cl.
CPC ......... *H04N 21/4334* (2013.01); *H04N 7/162* (2013.01); *H04N 7/1675* (2013.01);
(Continued)

(58) Field of Classification Search
CPC ........ H04N 7/20; H04N 7/162; H04N 7/1675; H04N 21/26606; H04N 21/26613; H04N 21/4623
See application file for complete search history.

(56) References Cited

U.S. PATENT DOCUMENTS 5,802,063 A 9/1998 Deiss
7,003,117 B2 2/2006 Kacker et al.
(Continued)

OTHER PUBLICATIONS

U.S. Appl. No. 13/324,634, filed Nov. 26, 2008, Non Final Rejection mailed Nov. 19, 2010, all pages.
(Continued)

*Primary Examiner* — Jason Salce
(74) *Attorney, Agent, or Firm* — Kilpatrick Townsend & Stockton LLP

(57) ABSTRACT

One embodiment takes the form of a method and apparatus for creating a customer-specific encryption key for encrypting digital information. The encryption key may be based on a customer number and may be associated with several devices such that the devices may encrypt and decrypt the digital information. Because each device may have the same encryption key, the encrypted data may be encrypted by a first device, transferred from the first device to a second device and decrypted and read by the second device. Thus, encrypted digital information may be shared between devices that generate a customer-specific encryption key from a common customer number. In one embodiment, the customer-specific encryption key may be utilized by a set-top box of a television system to encrypt and decrypt a digitally recorded television program.

20 Claims, 5 Drawing Sheets

(51) Int. Cl.
*H04N 7/16* (2011.01)
*H04N 7/20* (2006.01)
*H04N 21/266* (2011.01)
*H04N 21/4623* (2011.01)
*H04N 21/418* (2011.01)
*H04N 21/4405* (2011.01)
*H04N 21/61* (2011.01)

(52) U.S. Cl.
CPC ......... *H04N 7/20* (2013.01); *H04N 21/26606* (2013.01); *H04N 21/26613* (2013.01); *H04N 21/4181* (2013.01); *H04N 21/4405* (2013.01); *H04N 21/4623* (2013.01); *H04N 21/6143* (2013.01)

(56) References Cited

U.S. PATENT DOCUMENTS

| | | |
|---|---|---|
| 8,583,922 B2 | 11/2013 | Kahn |
| 9,414,031 B2 | 8/2016 | Newell et al. |
| 2001/0039659 A1 | 11/2001 | Simmons et al. |
| 2002/0026575 A1 | 2/2002 | Wheeler et al. |
| 2002/0029384 A1 | 3/2002 | Griggs |
| 2002/0048367 A1 | 4/2002 | Maillard |
| 2003/0048380 A1 | 3/2003 | Tamura |
| 2004/0024702 A1 | 2/2004 | Angel et al. |
| 2006/0041905 A1 | 2/2006 | Wasilewski |
| 2006/0109982 A1 | 5/2006 | Puiatti et al. |
| 2006/0282390 A1 | 12/2006 | Gupte |
| 2006/0282847 A1 | 12/2006 | Gupte |
| 2008/0201749 A1 | 8/2008 | Liu et al. |

OTHER PUBLICATIONS

U.S. Appl. No. 13/324,634, filed Nov. 26, 2008, Non Final Rejection mailed Jun. 10, 2011, all pages.

U.S. Appl. No. 13/324,634, filed Nov. 26, 2008, Final Rejection mailed Nov. 15, 2011, all pages.

U.S. Appl. No. 13/324,634, filed Nov. 26, 2008, Non-Final Rejection mailed Sep. 30, 2014, all pages.

U.S. Appl. No. 13/324,634, filed Nov. 26, 2008, Non-Final Rejection mailed Apr. 17, 2015, all pages.

U.S. Appl. No. 13/324,634, filed Nov. 26, 2008, Final Rejection mailed Dec. 10, 2015, all pages.

ACCOUNT-SPECIFIC ENCRYPTION KEY

CROSS-REFERENCE TO RELATED APPLICATION(S)

This is a continuation of U.S. patent application Ser. No. 12/324,634, entitled "Account-Specific Encryption Key," filed on Nov. 26, 2008, the entire disclosure of which is incorporated herein by reference for all purposes.

TECHNICAL FIELD

The present invention relates generally to satellite television systems, and more particularly to generating a common encryption key from an account or customer-specific number such that removable devices may be shared amongst several satellite television receivers associated with the same account or customer.

BACKGROUND

A satellite or digital cable television system may provide television programs to subscribers of the television system. Typically, satellite and digital cable television systems include a set-top box that receives and decrypts the television signal such that a television program may be viewed by the user. In many satellite television system, the television signal may be broadcast by a satellite, collected by a satellite dish antenna and decoded by the set-top box. In digital cable systems, the television signal is typically transmitted to the user through a cable connected directly to the set-top box.

Many current set-top boxes may also include a digital video recorder contained within, or otherwise connected to, the set-top box. A digital video recorder is a device that may record video and/or audio in a digital format to a disk drive or other memory medium within the device. Through the digital recorder, a user may record a television program to a memory medium so that the program may be viewed by the user at a more convenient time. Recording the program may also allow the user to fast-forward or skip the unwanted sections of the program, as well as rewind to watch the program again. Thus, with the inclusion of the digital video recorder, a set-top box may not only receive and convert the television signal from the television provider, but may also record a television program for later playback by the user.

As mentioned above, the digital video recorder may store the recorded program on a memory medium. In many cases, the memory medium may be a hard drive device that is external to the set-top box but configured to receive the digital information of the recorded program. The external hard drive of the set-top box may be configured to store the recorded programs of the digital video recorder in a convenient device that may be disconnected from the set-top box and easily transported without the need to carry the entire set-top box.

BRIEF SUMMARY

One common protection scheme that is used with set-top boxes, often when coupled with external hard drives, is to encrypt content received by each set-top box with a key unique to that set-top box. For example, some external hard drives will only play back stored, encrypted content on the same set-top box from which the program was stored. Thus, even though external hard drives may provide more portability, many external hard drives are dedicated to, or paired with, one set-top box and the information stored on those hard drives cannot be read by a separate set-top box. Therefore, what is needed is a method and apparatus for allowing a user to view programs stored on an external hard drive on multiple set-top boxes. However, the portability of the external hard drive should not be so vast that the stored programs may be viewed by any set-top boxes. Instead, what is needed is a method to ensure portability of the recorded programs without providing the ability to share recorded programs among separate customers to the television's system.

One embodiment may take the form of a method for digitally recording a television program. The method may include the operation of providing a customer identification number to a first set-top box. The first set-top box may then perform the operations of generating a first encryption key based on the customer identification number, encrypting a television program using the first encryption key and storing the television program in a storage medium.

Another embodiment may take the form of a system for sharing a digitally recorded television program. The system may include a provider source configured to transmit a customer-specific number, a first set-top box configured to generate an encryption key from the customer-specific number and utilize the encryption key to encrypt a television program and an external hard drive in communication with the first set-top box configured to receive and store the encrypted television program.

Still another embodiment may take the form of a method for digitally recording a television program. This method may include the operation of receiving a customer identification number from a provider source, with the customer identification number indicative of an account associated with a customer. The method may also include the operations of generating an encryption key from the customer identification number using a key generating algorithm with the customer identification number as a seed, encrypting a television program using the encryption key and storing the encrypted television program in a storage medium.

DETAILED DESCRIPTION

One embodiment takes the form of an apparatus for creating a customer-specific encryption key for encrypting digital information. The encryption key may be based on a customer number and may be associated with several devices such that each device may encrypt and decrypt the digital information. Because each device may have access to or store the same encryption key, the stored data may be encrypted by a first device on a storage medium, accessed on the storage medium by a second device (or transferred to the second device) and decrypted by the second device. Thus, encrypted digital information may be shared between devices that generate an identical customer-specific encryption key from a common customer number.

In another embodiment, a set-top box (STB) of a satellite or digital television system associated with a particular customer may store the customer-specific identification number. Each STB may then use the customer identification number to generate a common encryption key to encrypt and decrypt digital information. Thus, each STB with the same customer number may decrypt information encrypted by another STB. Such digital information may include a digitally recorded television program that is stored on an external hard drive. Through this embodiment, the external hard drive may be shared between STBs such that a recorded program may be viewed from any STB that includes the same customer identification number.

Figure 1:
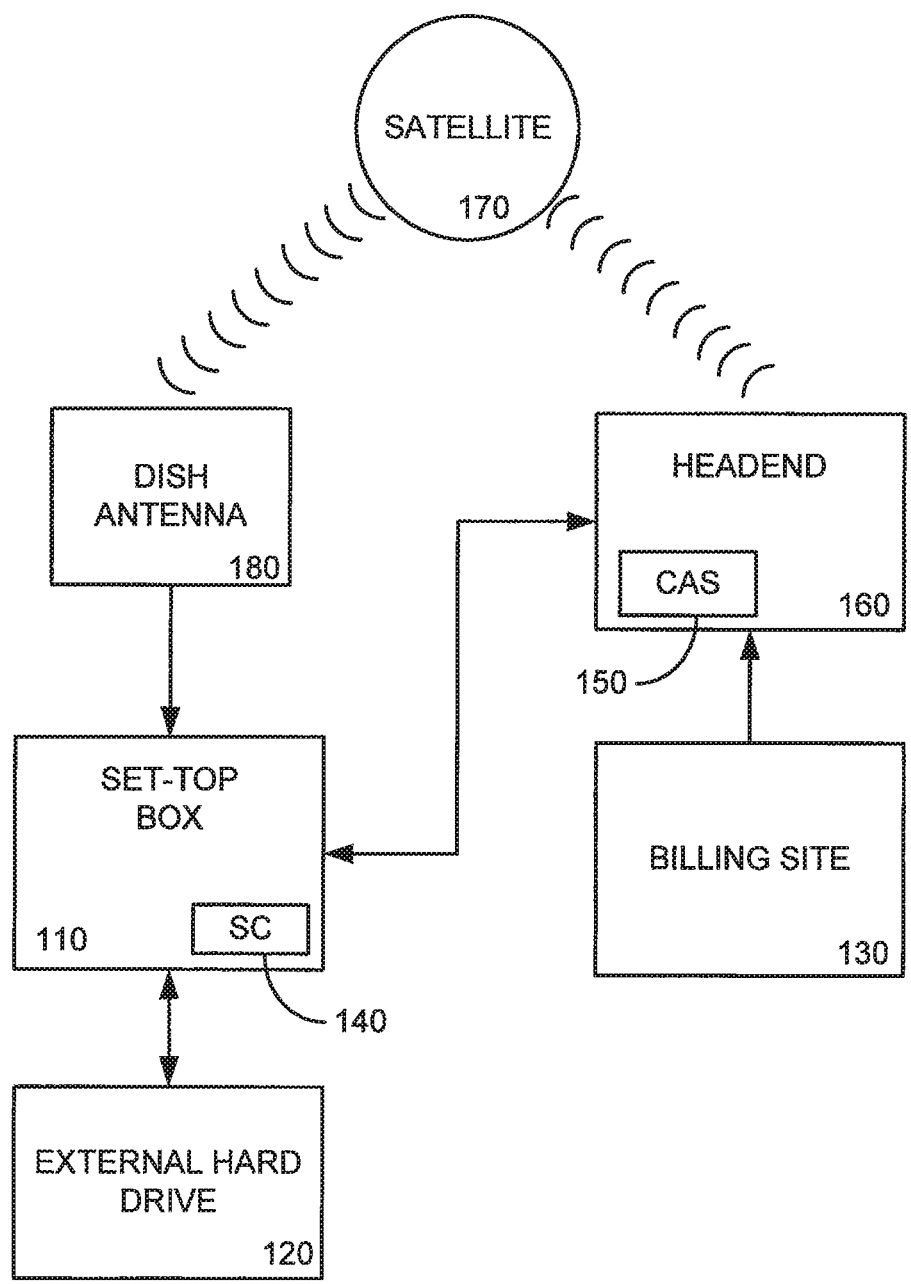
FIG. 1 depicts a first embodiment of a satellite television system utilizing a customer-specific identification to encrypt a recorded program.

FIG. 1 depicts a first embodiment of a satellite television system utilizing a customer-specific identification to encrypt a recorded program. This embodiment may allow a user of the television system to share recorded programs between STBs that are associated with a customer, while preventing the sharing of the recorded programs between different customers of the system. The system of FIG. 1 is but one example of a television system that may implement the method of the present disclosure.

As described above, a STB 110 may be included in the system to receive a signal from a television provider and convert it into a signal that the user's television may recognize and display. The STB 110 also may include a digital video recorder (DVR) feature may be incorporated into, or otherwise connected to, the STB to digitally store a television program in memory for later playback by the user. Generally, an "STB" as used herein encompasses any type of device that may convert a television signal into a usable signal for a user's television as well as digitally record a television program for later playback.

The memory accessed by the STB 110 to store the television program may be contained within the STB or may be an external hard drive 120. In an external hard drive 120 configuration, the hard drive may be a separate device that connects to the STB 110 wirelessly or through a cable such that the hard drive may receive digital information from the STB and store the information in the hard drive memory. For example, the external hard drive 120 may connect to the STB 110 via a universal serial bus (USB) connection to receive the digital information. Other examples of connections between the STB 110 and the external hard drive 120 include, but are not limited to, a 1394/FireWire connection, an ATAPI connection, SCSI connection, PATA connection, SATA connection, 802.11(b), (g), or (n) connection, or any type of wireless communication protocols. Generally, any connection that allows the external hard drive 120 to receive digital information from the STB 110 may be used. It should be noted that the STB 110 may likewise access the data on the external hard drive 120 for playback.

A smart card 140 may also be associated with the STB 110 and may be used by the television system to identify the STB 110. For example, the smart card 140 may store a unique identifier, such as a smart card identification (ID) number. The smart card ID number may be used by the television system to identify the STB 110 and may differentiate the STB from every other STB in the television system. Thus, the television system may uniquely identify each STB 110 located within the television system by associating each STB with a smart card 140 number. Further, messages sent across the television system may be encrypted with a smart card number such that only a STB with that particular smart card may decrypt and read the message without allowing the other STBs of the system access to the message.

As mentioned above, the STB 110 may include a DVR to digitally record a television program and store the program in memory. In one embodiment, the recorded program may be stored on the external hard drive 120 that may be connected to the STB. In many instances, the STB 110 may utilize an encryption algorithm to encrypt the digital information prior to storing the information in memory to protect the digital recording from being read by other devices. However, the encryption of digital information generally means that only those devices that have access to the encryption key may read and interpret the stored information. Thus, the information stored on the external hard drive 120 of FIG. 1 may not be generally shared between STBs unless each STB has access to the same encryption key.

To provide the same encryption key to several STBs, a customer identification (ID) number may be provided to and used by each STB to generate an encryption key to encrypt the stored program. In one embodiment, the customer ID number may be generated by a billing site 130 and provided to the STB 110 over the satellite or digital television system. By providing the same customer number to multiple STBs, an encrypted program stored on a portable device may be shared between STBs such that a user may view the recorded program on several STBs, so long as the STBs may access the portable device 120. For example, the portable device may receive an encrypted recording from a first STB 110. Later, the portable device may be decoupled from the first STB 110 and plugged into a second STB to permit the second STB to access the recording, so long as the second STB can decrypt the recording with the appropriate key. This process is explained in more detail with respect to FIGS. 3 and 4, below. Further, the "customer ID number" may be an account number or any character string that uniquely identifies a particular account, customer or group of STBs.

As shown in FIG. 1, a television system may include a billing site 130 that may be maintained by either the television provider or a third party to perform the billing activities of the system. The billing site 130 may be used by the television system to track billing and provide billing statements to the customers of the system. Furthermore, the billing site 130 may also create, store and provide customer information to the television system. For example, the billing site 130 may create a customer ID number for each customer billing address. This ID number may be provided to the television system by the billing site 130 through a headend 160. The billing site 130 may also link or otherwise associate several smart card numbers that may be assigned to a single customer to that customers ID number. For example, a customer may have several STBs associated with his account. Each STB may be assigned an STB number to uniquely identify the STB to the television system as described above. Likewise, each smart card resident in an STB may be assigned a smart card number. The smart card associated with the STB may store both numbers. In cases where the customer may have several STBs associated with the account, the billing site 130 may link the smart card ID number of each STB associated with the user to the user's customer ID number. Thus, a single customer ID number may maintain an index of each STB on the account.

In this manner, any customer information that may be needed by the television system may be created and stored by the billing site 130. Alternatively, another element of the television system itself may store the customer information provided by the billing site 130 in a database. The television system may then access the database containing information about each customer of the television system when needed. In another embodiment, the television system may generate and store the customer information. For example, the headend 160 may act as the billing site and create and store the customer information described above.

As further shown in FIG. 1, a headend 160 may be included in the television system and may receive and process customer information. The headend 160 may be a master facility that receives television signals for processing and distribution to various television systems. For example, a satellite television provider headend 160 may receive television programs from the program producers. After receiving the programs, the headend 160 may process the programs (or other audio/visual presentations) to place them in a transmission format to broadcast those programs to subscribers. In a satellite television provider, the headend 160 may transmit the audio/visual signal to a satellite for redistribution to subscribers. In a cable television system provider, the headend 160 may transmit the television signal directly to the STB of the users over a cable network. Some content delivery systems may include several headends located throughout the network, each serving a subset of subscribers.

The headend 160 may also include a conditional access system (CAS) 150. The CAS 150 associated with the headend 160 may receive the customer information provided by the billing site 130 and convert it into a format that may be recognized by the rest of the television system. For example, in a satellite television system, the CAS 150 may convert the customer ID information into an encrypted signal that may be broadcast to the satellite 170 and rebroadcast from the satellite to the STB 110 of the user. Further, the CAS 150 may also encrypt the signal using a particular STB's smart card ID such that only the particular STB 110 may decrypt the signal. In this manner, the CAS 150 may prepare a signal that may be sent by the headend 160 to communicate with any STB in the television system.

To provide the customer ID number to the STB 110 such that the STB may use the customer ID to create an encryption key, the headend 160 may transmit the encrypted signal generated by the CAS 150 to a satellite 170 of a satellite television system. The satellite 170 may then re-broadcast the information to the STB 110 embedded in a standard transponder signal. In one example, the CAS 150 may embed the customer ID number within an entitlement management message (EMM) signal that may be broadcast across the television system. The STB 110 may then receive the EMM signal containing the customer ID through a standard satellite dish antenna 180 connected to STB 110. Upon receipt, the customer ID number may be removed from the EMM using the smart card 140 linked to STB 110. Once the customer ID is received and removed from the EMM signal, the customer ID may be stored by the STB 110 in memory for use in creating an encryption key. In one embodiment, the STB 110 may store the information in non-volatile memory for later use. In another embodiment, such information may be stored on the smart card 140. In alternative embodiments, the encryption key may be created by the billing site 130, headend 160, or other component, module or element and transmitted to the various STBs as part of a message, such as an entitlement management message (EMM). The EMM or other transmission may be keyed to either the customer/account ID or the smart card IDs to reduce the likelihood of other, non-authorized STBs acknowledging and/or employing the key contained in the message.

To provide the customer ID number to the STB 110 in a digital television system, the STB may be directly connected to the headend 160 through a cable or network connection 190. In a similar manner as with the satellite television system, the CAS 150 may generate the signal to be transmitted to and interpreted by the STB 110. However, in this system, the signal may be transmitted by the headend 160 over a cable or network connection to the STB 110, rather than through a satellite system. The cable or network connection may include, but is not limited to, an Ethernet connection, a coaxial connection, or a typical phone line. Generally, any transmission medium may be used to provide the generated signal to the STB 110. Further, it is not required that the STB 110 be connected directly to the headend 160 to receive the generated signal. Rather, the STB 110 may connect to the headend 160 through a series of connections maintained within a network, such as a WAN or the internet.

Figure 2:
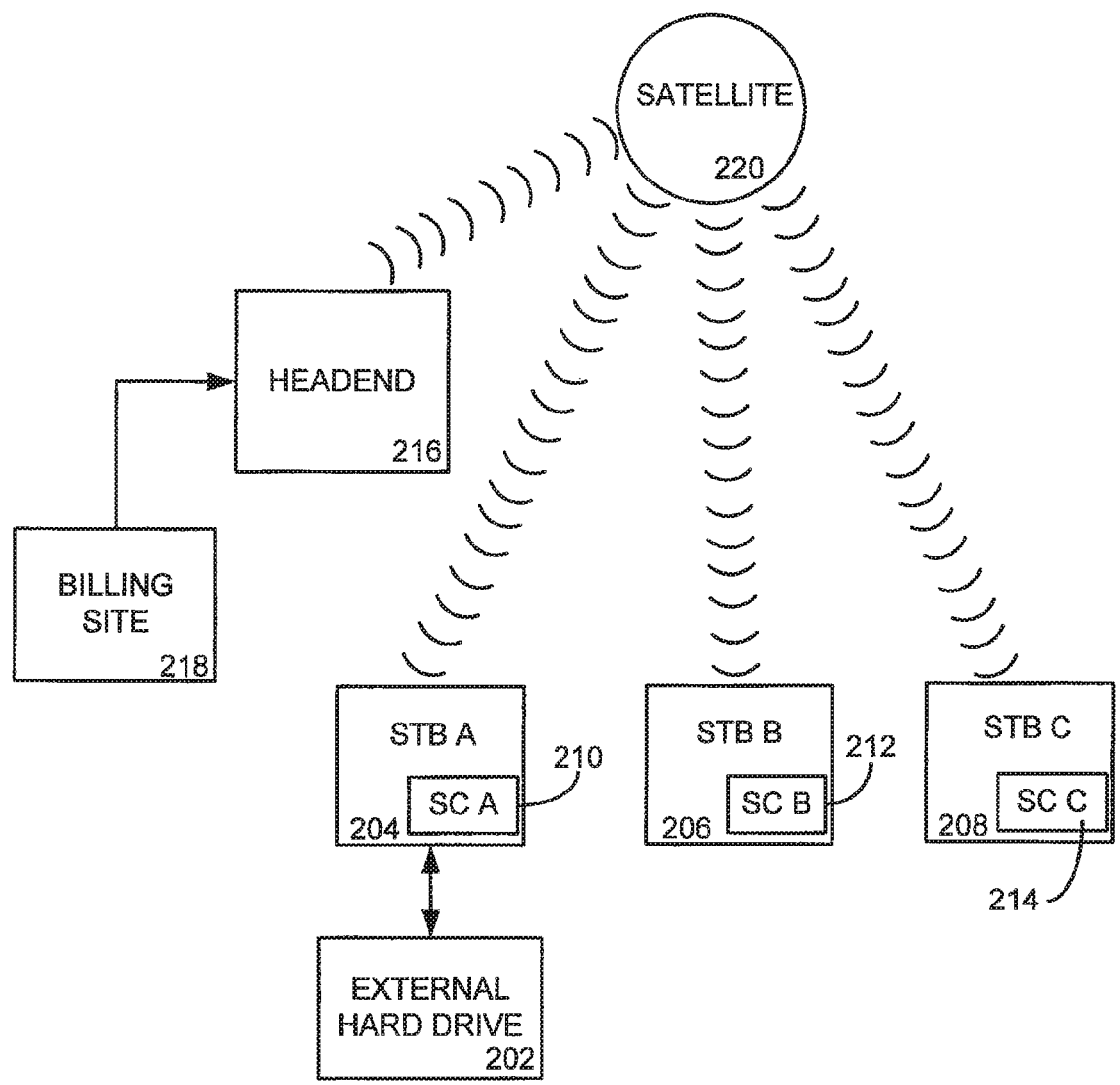
FIG. 2 depicts a second embodiment of a satellite television system utilizing a customer-specific identification with an external hard drive connected to a first set-top box.

FIG. 2 depicts a second embodiment of a satellite television system utilizing a customer-specific identification with an external hard drive connected to a first set-top box. In this embodiment, a customer ID number may be provided to several STBs that may be associated with a single customer in a similar manner as described above with reference to FIG. 1. By providing an identical customer ID number to each STB, the customer may utilize one STB to store an encrypted television program on an external hard drive 202 and a separate STB to view the recorded program.

As mentioned above, a single customer may have several STBs associated with the customer's account. For example, the customer may have one STB located in a living room of his house, another in a bedroom and a third in a den area. These STBs are depicted in FIG. 2 as STB A 204, STB B 206 and STB C 208. However, it should be appreciated that the STBs associated with a customer ID number need not be located within a single house. For example, a single customer may have an STB located in a first house and a second STB located in a second house. Generally, the STBs associated with a single customer account may be located anywhere within the television system.

A unique smart card may be associated with each STB of the embodiment. Similar to the smart card described above with reference to FIG. 1, the smart cards may be used by the television system to identify the STBs through a unique smart card ID number. Thus, smart card A 210 may be associated with STB A 204, smart card B 212 may be associated with STB B 206 and smart card C 214 may be associated with STB C 208. Further, each smart card may have a unique ID number such that the television system may identify the STBs within the television system.

To provide the customer ID information to each STB associated with a particular customer, the above steps may be repeated for each STB associated with the customer number. For example, a headend 216 may receive from a billing site 218 a customer ID number and all STBs and smart card numbers associated with that customer number. Once all of the STBs and smart card numbers are received, a CAS may generate the proper messages for each STB. For example, the CAS may generate an EMM containing the customer ID number that STB A 204 may decrypt and read. In one embodiment, the CAS may encrypt this signal using the unique ID number of smart card A 210 such that only STB A 204 may decrypt the signal. Generally, the CAS may use any algorithm to encrypt the message such that a particular STB may decrypt and read the message. Further, the CAS may continue to generate messages for each STB on the customer's account. Thus, the CAS may then generate messages containing the customer ID number for both STB B 206 and STB C 208 using the smart card numbers associated with the STBs, respectively. These messages may be provided to the headend 216 for transmission to the STBs through the television system. It should also be noted that not every STB associated with the customer ID number may receive the customer information. An embodiment may limit the number and type of STBs that receive the customer information by generating encrypted signals for a portion of the associated STBs. In certain embodiments, a single message may be generated and broadcast to allow every STB associated with a user's account access to the aforementioned data.

Figure 3:
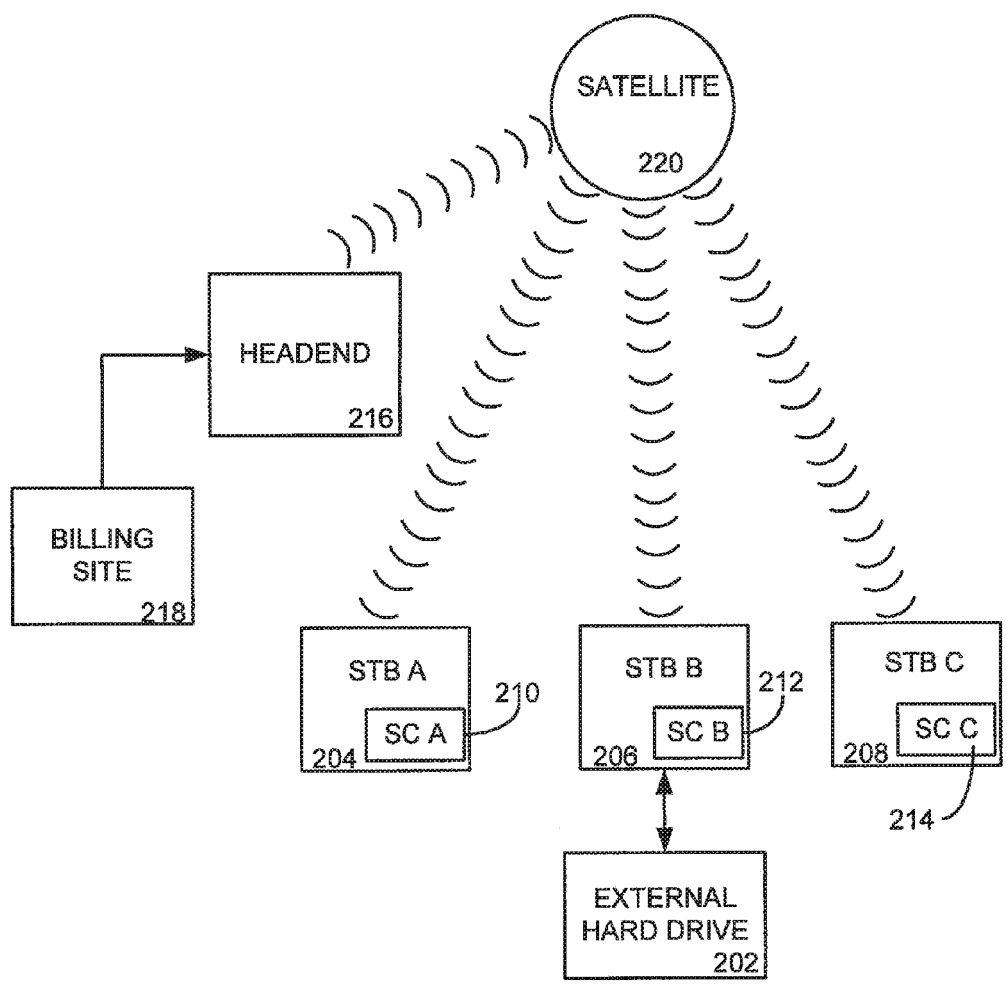
FIG. 3 depicts the second embodiment of FIG. 2 utilizing a customer-specific identifier with an external hard drive connected to a second set-top box.

Once the encrypted message is created, the headend 216 may then transmit the messages to each of the user's STBs, either over a network connection (not shown) or through a satellite 220. Once received, the customer ID number may be stored in memory of each STB associated with the customer ID. This customer ID number may then be used by the STBs to generate an encryption key to encrypt and decrypt digital information stored on an external hard drive 202. For example, STB A 204 may include a DVR to record a television program provided by the satellite television system. In conjunction with the recording of the program, STB A 204 may encrypt the digital data being transmitted to, or stored on, the external hard drive 202 to prevent unauthorized access of the stored program. To encrypt the data, STB A 204 may generate an encryption key from the stored customer ID number. For example, the customer ID number may be a 16 digit number. This number may be converted into a 128-bit encryption key using any known encryption algorithm. Once generated, the encryption key may be used to encrypt the digital recording of the television program. Upon encryption, the program may be transmitted to and stored in memory, such as an external hard drive 202. In alternative embodiments, the external hard drive 202 or other peripheral may encrypt data as it is received from an STB, FIG. 3 depicts the embodiment of FIG. 2 with an external hard drive connected to a second set-top box. The system depicted in FIG. 3 is the same system depicted in FIG. 2, with the external hard drive 202 connected to STB B 206.

As described above with reference to FIG. 2, a recorded television program may be encrypted by STB A 204 and stored on an external hard drive 202. STB A 204 may encrypt the television program using an encryption key based on a customer ID number. As shown in FIG. 3, the external hard drive 202 may then be disconnected from STB A 204 and connected to STB B 206. For example, a user of the television system may record a television program on STB A 204, which may be located in a living room of the user's home. The television program may be stored on an external hard drive 202. After storing the program, the user may disconnect the hard drive 202 from STB A 204 and physically move the hard drive and connect it to STB B 206. As one example, STB B 206 may be located in a separate room in the user's house, such as a bedroom. Alternatively, STB B 206 may be located in a separate location, such as a second house. Generally, STB B 206 may be located anywhere within the coverage of the satellite 220 or service provider's broadcast area.

To be able to view the recorded program on a television associated with STB B 206, STB B may decrypt the stored program. To correctly decrypt the stored program, STB B 206 may use an encryption key that may be generated in a similar manner as described above with reference to STB A 204. As previously described with reference to FIG. 2, each STB associated with a customer number may receive the customer ID number. Thus, STBs A-C each receive the customer ID number through a satellite broadcast. (Depending on the physical location of the STBs, different satellites may broadcast the information to different STBs.) Further, each STB of the system may generate the same encryption key using an encryption key generating algorithm and using the customer ID number as a seed for the key. Because each STB associated with a single customer number generates the same encryption key, each STB may encrypt or decrypt a stored program. Thus, in FIG. 3, the external hard drive 202 that contains the stored and encrypted program may be connected to STB B 206. STB B 206 may use the general encryption key that is based on the customer ID number to decrypt the program such that the program may be viewed on the television associated with STB B. In a similar manner, STB C 208 may also decrypt the stored program. However, it should be noted that, because the encryption key is generated using the customer ID number, only those STBs with the same customer ID number stored in memory may generate the proper encryption key to decrypt the stored program. Thus, STBs not associated with a particular customer number may not decrypt and view the stored program.

Alternatively, the various STBs may be connected to one another via a network 222. In such a case, encrypted content or other data may be transferred across the network 222 between STBs. This may permit secure content sharing without requiring the external hard drive 202 to be moved between STBs. It should be noted that the network 222 is not restricted to a particular setting, premise or location and that other receivers may take the place of, or operate in a similar manner to, an SIB.

Generating an encryption key from a customer ID number may also be beneficial if the user's STB fails during use. As mentioned above, the information stored on the external hard drive may be encrypted when the information is stored. However, if the STB that encrypts the information fails and must be replaced, the information on the hard drive may not be able to be decrypted without the proper encryption key. A new STB may not have the necessary encryption key to decrypt the stored information. However, by providing the customer ID number to the new STB through the above embodiments, the new STB may generate an encryption key that may allow the user to view the stored program on the external hard drive 202.

Figure 4:
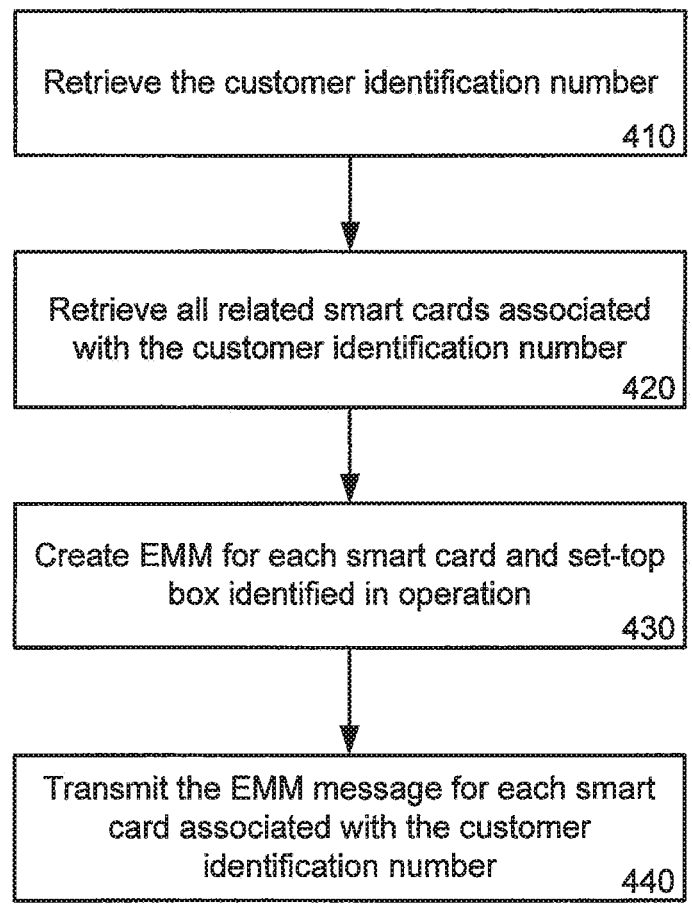
FIG. 4 is a flow chart depicting a method for providing a customer-specific identifier to multiple set-top boxes to encrypt and decrypt a recorded program.

FIG. 4 depicts a flow chart for providing a customer-specific identifier to multiple set-top boxes to encrypt and decrypt a recorded program. This embodiment, taking the form of a method of operation, may be performed by a television system or service provider to provide a customer ID number to several devices within the system. The customer ID number may then be utilized by the several devices to generate an encryption key to encrypt digital data. In one example, the embodiment may be performed by a headend of a satellite television system.

The embodiment may begin in operation 410 when the headend retrieves a customer identification number. As described above, the headend may retrieve the customer identification number from a billing site associated with the television system. Alternatively, the customer ID number may be stored in a database by the headend. Thus, when the customer ID number is needed, the headend may access the database to retrieve the customer ID number.

In operation 420, the headend may retrieve information relating to each set-top box that may be associated with the customer ID number. In one example, each set-top box may be identified by an associated smart card number, a STB identifier, or a combination of the two. As explained above, a customer to the television system may have several STBs associated with a single account. Each of these STBs may be identified by one or more unique identifier associated with each STB, such as the aforementioned STB number and/or smart card number. In yet other alternative embodiments, the unique identifier for a given STB may be a combination of all or segments of the STB number and smart card number. For example, the unique identifier may be the last four digits of the STB number coupled with the last four digits of the smart card number. Thus, each customer ID number may have several STBs associated with the account, with each STB identified by a unique identifier.

Similar to the retrieval of the customer ID number in operation 420, the associated smart card numbers with the account may be retrieved from the billing site or from a database. However, it should be appreciated that information about every STB associated with the customer's account need not be retrieved in operation 420. Rather, the embodiment may retrieve information on any number of the associated STBs.

Once each STB associated with the account is identified in operation 420, the embodiment may create an entitlement management message (EMM) in operation 430 for each STB identified. As described herein, the EMMs may be generated by a conditional access system (CAS). The CAS may integrate the customer ID number into each EMM such that the customer ID number may be provided to the other devices within the television system.

Further, each EMM created may be unique to the unique identifiers of the identified STBs. For example, the embodiment may create a first EMM that is encrypted with the unique identifier of a first STB associated with the user's account. The encryption may be such that only a STB with a particular identifier may decrypt the EMM. Similarly, the embodiment may create a second EMM that is encrypted with the unique identifier of a second STB associated with the user's account. These operations may continue for each STB associated with the user's account until the system or provider has created a related EMM for each such STB. In other embodiments, a single EMM may carry the foregoing information for each STB and, thus, only a single EMM may be created. As described in more detail herein, upon receipt, the customer ID number may be extracted from the EMM signal and used to generate an encryption key for encrypting and decrypting digital information.

In operation 440, the EMMs created in operation 430 may be transmitted to each STB associated with the user's account. Each EMM may be transmitted to the STBs at the same time, or may be transmitted separately to each STB. To transmit the EMMs in a satellite television system, the headend may transmit the messages to a satellite device that may relay the EMM to the user's STB devices. In a digital television system, the headend may transmit the EMMs to the user's STBs through a satellite, cable or other connection that allows the STB to receive the EMM. In any case, the headend may provide the EMM to the STB for use in encrypting and decrypting digital information.

Figure 5:
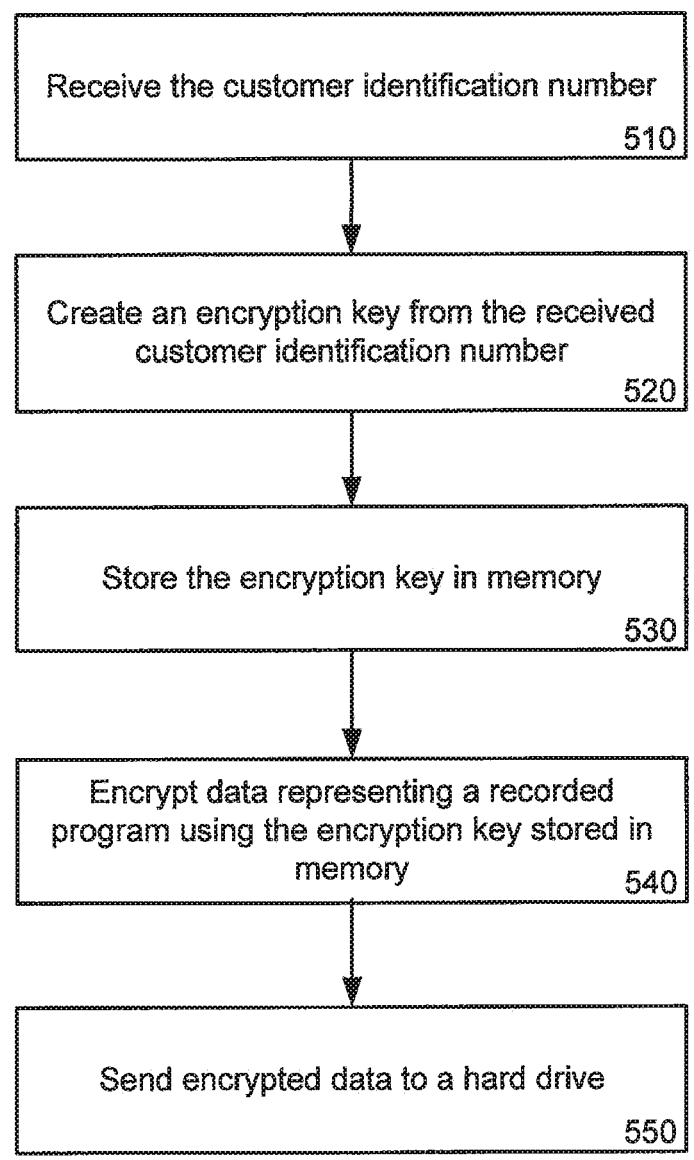
FIG. 5 is a flow chart depicting a method for receiving a customer-specific identifier and creating an encryption key to encrypt a recorded program.

FIG. 5 depicts a flow chart for receiving a customer-specific identifier and generating an encryption key to encrypt a recorded program. The embodiment may be performed by an STB of a television system to generate an encryption key from a customer ID number to encrypt digital information, such as a television program.

The embodiment may begin in operation 510, in which the STB receives a customer ID number. As one example, the customer ID number may be received from a satellite. In a digital cable television system, the customer ID number may be received from a headend. Further, as described herein, the customer ID number may be included in an EMM. In this example, the STB may decrypt the EMM using a unique smart card number associated with the STB to extract the customer ID number from the EMM.

Once the customer ID number has been received, the STB may use the customer ID number to create an encryption key using the ID number as a seed for the key in operation 520. For example, the STB may include an algorithm to generate a 128-bit encryption key from a customer ID number. Each STB on the user's account may include the same algorithm. It should be appreciated that those skilled in the art will understand the different algorithms that may be used to create an encryption key from a customer ID number.

In operation 530, the STB may store the created encryption key. In one embodiment, the encryption key may be stored in volatile or non-volatile memory. In general, the encryption key may be stored on a machine-readable or computer-readable storage medium, including but not limited to, magnetic floppy disks, hard disks, optical disks or a semiconductor based memory, which may be permanently, removably or remotely coupled to a microprocessor or memory system. Alternatively, the key may be stored in flash memory, read-only memory, or other solid state memory. The encryption key may be stored in volatile or non-volatile memory associated with the STB or on the smart card.

After the encryption key is stored in memory, the STB may be used to digitally record a television program. As part of the recording, the data representing the program may be encrypted using the encryption key in operation 540. After encryption using the encryption key, the digital data may be stored in memory in operation 550. As described herein, the digital information may be stored in memory that is contained within the STB or to an external hard drive.

It should be noted that the flowcharts of FIGS. 4 and 5 are illustrative only. Alternative embodiments of the present invention may add operations, omit operations, or change the order of operations without affecting the spirit or scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

What is claimed is:

1. A method for digitally recording a television program, the method comprising:
   obtaining, at a first set-top box associated with a customer, a customer identification number that corresponds to the customer;

generating, with the first set-top box, a first encryption key based on the customer identification number;
encrypting, with the first set-top box, a television program using the first encryption key;
storing the encrypted television program in a storage medium;
transmitting, by the first set-top box, the customer identification number to a second set-top box after generating the first encryption key based on the customer identification number;
generating, with the second set-top box, a second encryption key based on the customer identification number, wherein the first encryption key and the second encryption key are the same; and
decrypting, with the second set-top box, the television program using the second encryption key, wherein when the television program is decrypted, the decrypted television program is displayable on a display device.

2. The method of claim 1, further comprising:
retrieving, with the first set-top box, a first smart card identification number from a first smart card located in the first set-top box;
decrypting, with the first set-top box, the customer identification number using the first smart card identification number to obtain the customer identification number;
generating, with the first set-top box and in response to decrypting the customer identification number using the first smart card identification number, a first encryption key based on the customer identification number.

3. The method of claim 1, wherein the customer identification number is received at the first set-top box from a satellite of a satellite television system.

4. The method of claim 1, wherein obtaining the customer identification number that corresponds to the customer further comprises:
receiving, at a headend, the customer identification number from a billing site;
retrieving a particular smart card identification number associated with the customer identification number;
generating an encrypted customer identification number using the particular smart card identification number; and
transmitting the encrypted customer identification number to the first set-top box.

5. The method of claim 1, wherein the first set-top box and the second set-top box are both associated with the customer, and the first and second set-top boxes are located in different houses.

6. The method of claim 1, further comprising:
retrieving a first smart card identification number from each smart card located in a set-top box associated with the customer identification number, wherein a first smart card identification number from a first smart card located in the first set-top box and a second smart card identification number from a second smart card located in the second set-top box are associated with the customer number;
generating an entitlement management message (EMM) for each smart card identification number associated with a smart card; and
transmitting the EMM message for each smart card associated with the customer identification number.

7. A system, comprising:
a first set-top box associated with a customer, the first set-top box configured to:
obtain a customer identification number that corresponds to the customer;
generate a first encryption key based on the customer identification number;
encrypt a television program using the first encryption key;
a second-set top box associated with the customer, the second set-top box configured to:
receive, from the first set-top box, the customer identification number after the first set-top box generates the first encryption key based on the customer identification number;
generate a second encryption key based on the customer identification number, wherein the first encryption key and the second encryption key are the same; and
decrypt the television program using the second encryption key, wherein when the television program is decrypted, the decrypted television program is displayable on a display device.

8. The system of claim 7, wherein the first set-top box is further configured to:
retrieve a first smart card identification number from a first smart card located in the first set-top box;
decrypt the customer identification number using the first smart card identification number to obtain the customer identification number;
generate a first encryption key based on the customer identification number.

9. The system of claim 7, wherein obtaining the customer identification number that corresponds to the customer further comprises:
receiving, at a headend, the customer identification number from a billing site;
retrieving a particular smart card identification number associated with the customer identification number;
generating an encrypted customer identification number using the particular smart card identification number; and
transmitting the encrypted customer identification number to the first set-top box.

10. The system of claim 7, wherein the first set-top box is further configured to:
retrieve a first smart card identification number from each smart card located in a set-top box associated with the customer identification number, wherein a first smart card identification number from a first smart card located in the first set-top box and a second smart card identification number from a second smart card located in the second set-top box are associated with the customer number;
generate an entitlement management message (EMM) for each smart card identification number associated with a smart card; and
transmit the EMM message for each smart card associated with the customer identification number.

11. The system of claim 7, wherein the first set-top box is further configured to:
transmit the customer number to the second set-top box after generating the first encryption key based on the customer identification number.

12. A system, comprising:
one or more processors; and
a memory having instructions stored thereon, which when executed by the one or more processors, cause the computing device to perform operations including:

obtaining, at a first set-top box associated with a customer, a customer identification number that corresponds to the customer, wherein the customer identification number is received at the first set-top box from a satellite of a satellite television system;

generating, with the first set-top box, a first encryption key based on the customer identification number;

encrypting, with the first set-top box, a television program using the first encryption key;

storing the encrypted television program in a storage medium;

generating, with a second set-top box, a second encryption key based on the customer identification, wherein the first encryption key and the second encryption key are the same; and decrypting, with the second set-top box, the television program using the second encryption key, wherein when the television program is decrypted, the decrypted television program is displayable on a display device.

13. A system, comprising:

one or more processors; and a memory having instructions stored thereon, which when executed by the one or more processors, cause the computing device to perform operations including:

obtaining, at a first set-top box associated with a customer, a customer identification number that corresponds to the customer;

generating, with the first set-top box, a first encryption key based on the customer identification number;

encrypting, with the first set-top box, a television program using the first encryption key;

storing the encrypted television program in a storage medium;

generating, with a second set-top box, a second encryption key based on the customer identification, wherein the first encryption key and the second encryption key are the same, wherein the first set-top box and the second set-top box are both associated with the customer, and wherein the first and second set-top boxes are located in different houses; and decrypting, with the second set-top box, the television program using the second encryption key, wherein when the television program is decrypted, the decrypted television program is displayable on a display device.

14. The system of claim 13, wherein the operations further include:

transmitting, by the first set-top box, the customer number to the second set-top box after generating the first encryption key based on the customer identification number.

15. A television receiver, comprising:

one or more processors;

a wireless transceiver communicatively coupled to the one or more processors;

a non-transitory computer readable storage medium communicatively coupled to the one or more processors, wherein the non-transitory computer readable storage medium includes instructions that, when executed by the one or more processors, cause the one or more processors to perform operations including:

obtaining, at a first set-top box associated with a customer, a customer identification number that corresponds to the customer;

generating, with the first set-top box, a first encryption key based on the customer identification number;

encrypting, with the first set-top box, a television program using the first encryption key;

storing the encrypted television program in a storage medium;

transmitting, by the first set-top box, the customer identification number to a second set-top box after generating the first encryption key based on the customer identification number;

generating, with the second set-top box, a second encryption key based on the customer identification number, wherein the first encryption key and the second encryption key are the same; and decrypting, with the second set-top box, the television program using the second encryption key, wherein when the television program is decrypted, the decrypted television program is displayable on a display device.

16. The television receiver of claim 15, wherein the operations further include:

retrieving, with the first set-top box, a first smart card identification number from a first smart card located in the first set-top box;

decrypting, with the first set-top box, the customer identification number using the first smart card identification number to obtain the customer identification number;

generating, with the first set-top box and in response to decrypting the customer identification number using the first smart card identification number, a first encryption key based on the customer identification number.

17. The television receiver of claim 15, wherein the customer identification number is received at the first set-top box from a satellite of a satellite television system.

18. The television receiver of claim 15, wherein obtaining the customer identification number that corresponds to the customer further comprises:

receiving, at a headend, the customer identification number from a billing site;

retrieving a particular smart card identification number associated with the customer identification number;

generating an encrypted customer identification number using the particular smart card identification number; and transmitting the encrypted customer identification number to the first set-top box.

19. The television receiver of claim 15, wherein the first set-top box and the second set-top box are both associated with the customer, and the first and second set-top boxes are located in different houses.

20. The television receiver of claim 15, wherein the operations further include:

retrieving a first smart card identification number from each smart card located in a set-top box associated with the customer identification number, wherein a first smart card identification number from a first smart card located in the first set-top box and a second smart card identification number from a second smart card located in the second set-top box are associated with the customer number;

generating an entitlement management message (EMM) for each smart card identification number associated with a smart card; and transmitting the EMM message for each smart card associated with the customer identification number.

* * * * *